United States Patent [19]

Uno et al.

[11] 4,089,015

[45] May 9, 1978

[54] DUAL FUNCTION EXPOSURE TIME DISPLAY AND CONTROL CIRCUIT FOR SLR CAMERA

[75] Inventors: Naoyuki Uno, Urawa; Masahiro Kawasaki, Tokyo, both of Japan

[73] Assignee: Asahi Kogaku Kogyo Kabushiki Kaisha, Tokyo, Japan

[21] Appl. No.: 750,344

[22] Filed: Dec. 13, 1976

[30] Foreign Application Priority Data

Dec. 17, 1975 Japan .................. 50-171113[U]

[51] Int. Cl.² .................. G03B 7/08; G03B 7/00
[52] U.S. Cl. .................. 354/51; 354/60 E
[58] Field of Search .......... 354/23 R, 24, 36–38, 354/49, 50, 51, 59, 60 E, 60 R; 250/214 P

[56] References Cited

U.S. PATENT DOCUMENTS 3,842,424  10/1974  Tsunekawa et al. .......... 354/31

Primary Examiner—L. T. Hix
Assistant Examiner—William B. Perkey
Attorney, Agent, or Firm—Sughrue, Rothwell, Mion, Zinn and Macpeak

[57] ABSTRACT

A light meter circuit for an SLR camera implements full aperture viewfinding with a preselected exposure time by providing an integrating capacitor 25 for controlling the exposure time, a first switch 24 for enabling the charging of the capacitor, circuit means 26, 29 for controlling the charging of the capacitor, a variable resistor 30 for establishing the lens aperture value in an exposure time display mode, a fixed resistor 31 for establishing the aperture value in an exposure time control mode, and a second switch 32 for connecting one of the resistors to an input of the charging control circuit. When the shutter release button is depressed the second switch is transferred from the variable to the fixed resistor, and the first switch is subsequently opened to enable the charging of the capacitor.

1 Claim, 3 Drawing Figures

U.S. Patent    May 9, 1978    4,089,015
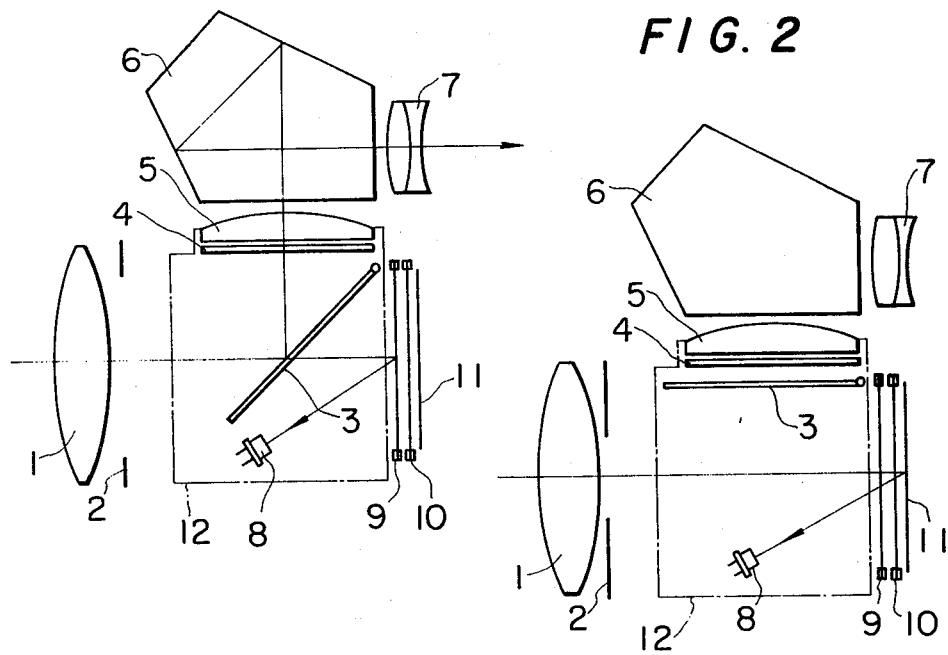
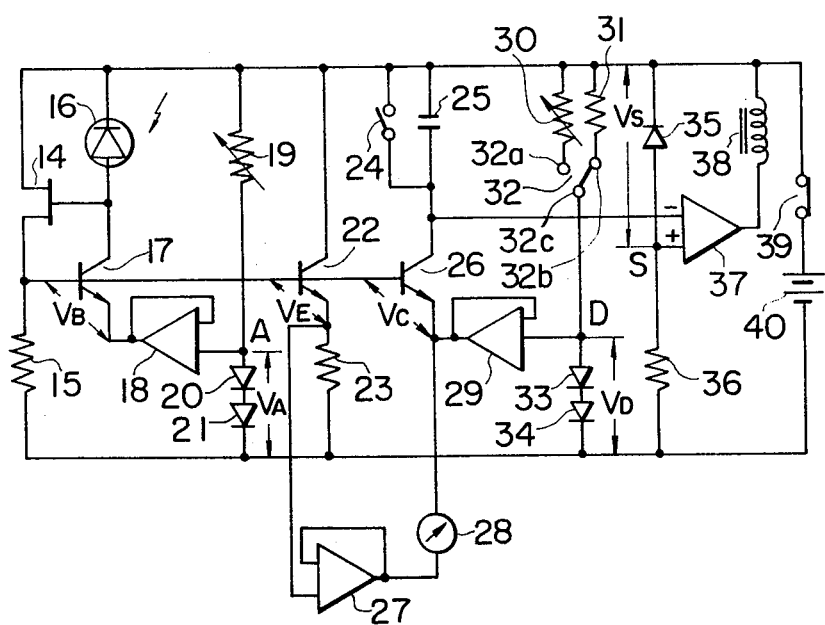

DUAL FUNCTION EXPOSURE TIME DISPLAY AND CONTROL CIRCUIT FOR SLR CAMERA

BACKGROUND OF THE INVENTION

This invention relates to a dual function exposure time display and control circuit for a TTL (Through the Taking Lens) single lens reflex camera.

In a single lens reflex camera with an automatic exposure time control device, after the reflecting mirror is raised the disphragm is stopped down to a preset value, and light passing through the lens is reflected by the front shutter curtain or the film surface onto a light sensing element mounted in the camera or mirror box. The sensing element output is thus proportional to the brightness of the photographic object, and together with other factors such as film sensitivity, is used to determine and control the exposure time. Initially, the lowered mirror, which includes a beam splitter, passes through light which is reflected onto the sensing element, and the output thereof, together with other factors, is employed for calculating and displaying the exposure time.

Since the lens is stopped-down in the exposure time control mode, any stop value error in the photographic lens can be theoretically disregarded and the exposure accuracy is accordingly high.

If the exposure time is preselected the diaphragm is stopped-down and the photographic operation is controlled in the stopped-down metering mode. In such a case, however, the viewfinder is relatively dark, and it is therefore difficult to establish the picture frame and accurately focus the camera on the object. In addition, the quick operation of the camera is greatly impeded. These factors constitute significant disadvantages of a conventional single lens reflex camera.

SUMMARY OF THE INVENTION

To eliminate these drawbacks, the present invention provides an exposure meter system wherein the viewing or display function in the stopped-down metering mode is carried out with a full or open lens aperture. To implement this, the invention provides for a switching or resistive change-over operation in the light meter circuit between the full aperture display mode and the stopped-down exposure time control mode.

Briefly, and in accordance with the present invention, a light meter circuit for an SLR camera implements full aperture viewfinding with a preselected exposure time by providing an integrating capacitor for controlling the exposure time, a first switch for enabling the charging of the capacitor, circuit means for controlling the charging of the capacitor, a variable resistor for establishing the lens aperture value in an exposure time display mode, a fixed resistor for establishing the aperture value in an exposure time control mode, and a second switch for connecting one of the resistors to an input of the charging control circuit. When the shutter release button is depressed the second switch is transferred from the variable to the fixed resistor, and the first switch is subsequently opened to enable the charging of the capacitor.

BRIEF DESCRIPTION OF THE DRAWINGS

In the drawings:

FIGS. 1 and 2 show sectional views of the essential components of a light metering device according to this invention with the reflex mirror lowered and raised, respectively, and FIG. 3 shows a schematic diagram of an exposure control circuit according to the invention.

DETAILED DESCRIPTION OF THE PREFERRED EMBODIMENT

Referring to the drawings, FIG. 1 shows a lens 1, a diaphragm 2, and a reflecting mirror 3, all or part of which is formed as a beam splitter, such as a half mirror. Further camera components comprise a Fresnel lens 4, a condenser lens 5, a penta prism 6, an ocular lens 7, a light sensing element 8, the front and rear curtains 9, 10 of a focal plane shutter, and a camera or mirror box 12. The light sensing element 8 is disposed in the lower part of the box 12 so that its surface faces toward the curtains 9, 10 and the film 11.

Since the mirror 3 is a beam splitter, part of the light from the photographic object passes through the mirror to the front shutter curtain 9, when the shutter is cocked, and the rear shutter curtain 10, after the shutter is released. If the surfaces of the front and rear curtains are provided with a suitable reflecting characteristic with regard to the exposure time control function, the light reflected by the front or rear curtains onto the light sensing element produces an object brightness signal which can be applied to a light meter circuit. The brightness signal, together with other exposure determining factors such as film sensitivity and lens stop or aperture value, is used to determined the exposure time, which may be displayed by an ammeter.

Upon the depression of a shutter release button, the diaphragm 2 is stopped down to a preset value as shown in FIG. 2, and the reflecting mirror 3 is simultaneously raised. Under these conditions, light from the object passes through the lens 1 and the diaphragm 2 to the front shutter curtain 9 or the film 11, and is reflected thereby onto the light sensing element 8. After a short time delay due to the response time of the light sensing element and the light meter circuit, a trigger signal correlated to the front shutter curtain release is applied to a time determination circuit, whereby the exposure time is determined by, inter alia, the light reflected from the front shutter curtain.

Alternatively, the camera may also include a pivotable light shielding plate disposed in front of the shutter curtains facing the lens, and movable to cover the beam splitter when the mirror is raised. Such a plate would have the same light reflecting characteristic as the shutter curtains.

For further background, the apex (Additive Photographic EXposure system) formulas for full aperture and stopped down light metering, and their application to a camera operation will be briefly described. Equation (1) below is the apex operation formula, which may be rewritten as equation (2) for an automatic exposure time controlled shutter according to the present invention.

$$T_V + A_V = B_V + S_V \tag{1},$$

and $$T_V = B_V + S_V - A_V \tag{2},$$

where
$T_V$ is the apex exposure time value,
$A_V$ is the apex aperture opening or $f$- stop value,
$B_V$ is the apex object brightness value, and $S_V$ is the apex film index value.

The operation of the camera to implement these formulas involves an optical function, an electrical circuit function, and a mechanical function.

In TTL metering, as in the present invention, the quantity of light $P_V$ passing through the lens can be expressed by the relation between $B_V$ and $A_V$ as indicated in equation (3) below. If an apex value corresponding to the full aperture stop value of the lens is designated by $A_{VO}$, then $P_V$, as indicated in equation (4) below, is a function of only the object brightness if the lens is fully opened.

$$P_V = B_V - A_V \qquad (3)$$

$$P_V' = B_V - A_{VO} \qquad (4)$$

Therefore, in the case of full aperture light metering, combining equations (2) and (4) yields:

$$T_V = P_V' + S_V - (A_V - A_{VO}) \qquad (5)$$

where $A_V \geq A_{VO}$.

Equation (5) indicates that, in the case of full aperture light metering, the coupling mechanism of the diaphragm for the camera is so arranged that the diaphragm provides the identical full aperture opening position for all interchangeable lenses having different full aperture stop values.

For stopped-down light metering, if equation (3) is substituted into equation (2), then:

$$T_V = P_V + S_V \qquad (6)$$

Since the $A_V$ is term is subjected to optical processing by the meter control system, it is not directly involved in the circuit operation.

The operation of the circuit shown in FIG. 3 will now be described. Light from the object passing through the lens 1 is converted by a photo-diode 16, corresponding to the light sensing element in FIGS. 1 and 2, into a photoelectric current proportional to the light intensity. A transistor 17 is self-biased by a buffer circuit consisting of a field-effect transistor 14 and a resistor 15, so that the collector current of transistor 17 is equal to the photoelectric current. A variable resistor 19 and compression diodes 20 and 21, for establishing the film sensitivity, are connected in series across a power supply 40. The connection point A of the variable resistor 19 and the compression diode 20 is connected to the input terminal of a voltage follower type of operational amplifier 18, the output terminal of which is connected to the emitter of transistor 17. A variable resistor 30 for establishing the stop value for the exposure time display in full aperture metering, and a fixed resistor 31 for exposure time control in stopped-down metering, are connected to stationary contacts 32a and 32b of a change-over switch 32, respectively. Compression diodes 33 and 34 are connected through an armature 32c of the change-over switch in series with one of the resistors 30 or 31 across the power supply 40. The connection point D of the armature 32c and the compression diode 33 is connected to the input terminal of a voltage follower type of operational amplifier 29, the output terminal of which is connected to the emitter of an expansion transistor 26. The base of transistor 26 is connected to the base of transistor 17, while its collector is connected to a time constant integrating capacitor 25 and a timing switch 24 controlled by the front curtain of the focal plane shutter. The collector of transistor 26 is also connected to the negative or inverting input terminal of a comparator 37.

The positive input terminal of the comparator 37 is connected to the junction point S between a Zener diode 35 and a resistor 36 which are connected in series across the power supply 40. The output terminal of the comparator is connected to a magnet 38 which controls the rear curtain. The base of a transistor 22, which forms an emitter follower with a resistor 23 for level shifting, is connected to the base of transistor 17, while an input terminal of a voltage follower type of operational amplifier 27 is connected to the junction point of resistor 23 and the emitter of transistor 22. The output terminal of amplifier 27 is connected to one terminal of an ammeter 28, the other terminal of which is connected to the emitter of transistor 26. A power switch 39 is closed when the shutter release button is depressed.

The operation of the above circuit will now be described with respect to an exposure time display mode in a full aperture light metering condition.

If the ohmic value of variable resistor 19 is $R_1$ and the voltage across it is $V_1$, then the current flowing in the compression diodes 20 and 21 can be expressed by the following equation:

$$i_1 = \frac{V_1}{R_1} \qquad (7).$$

The voltage $V_A$ at point A can be expressed by the following equation based on the logarithmic compression characteristic of the diodes 20, 21:

$$V_A = 2h\log(\frac{i_1}{i_S}) \qquad (8),$$

where $h = \frac{KT}{q}$, $K$ is the Boltzmann constant,
$T$ is the absolute temperature,
$q$ is the electric charge, and
$i_S$ is the reverse saturation current of the diodes.

For simplification, it is assumed that all of the compression diodes 20, 21, 33 and 34, and the base-emitters of transistors 17, 22 and 26 have equal logarithmic compression characteristics.

If the base-emitter voltage of transistor 17 is designated by $V_B$, then:

$$V_B = h\log(\frac{i_p'}{i_S}) \qquad (9),$$

where $i_p'$ is the photoelectric current of diode 16.

For an exposure time display with full aperture light metering, the armature 32c of switch 32 engages contact 32a. Under these conditions, if the value of resistor 30 is $R_2$ and the voltage across it is $V_2$, then the current $i_2$ flowing in diodes 33 and 34 and the voltage $V_D$ at point D are expressed by, respectively:

$$i_2 = \frac{V_2}{R_2} \qquad (10), \text{ and}$$

$$V_D = 2h\log(\frac{i_2}{i_S}) \qquad (11)$$

The values of resistors 19 and 30 are set to the apex values $S_V$ and $A_V$ of the film sensitivity and stop value, respectively, whereby:

$$R_1 = K_1 \cdot 2^{-0.5 S_V} \qquad (12),$$

and $$R_2 = K_2 \cdot 2^{-0.5(A_V - A_{VO})} \qquad (13),$$

where $K_1$ and $K_2$ are constants.

$A_V$ is expressed by equation (13) so that, as described with reference to equation (5), it corresponds to the difference between the preset stop value and the full aperture stop value; that is, $(A_V - A_{VO})$.

The photoelectric current $i_P'$ of the diode 16 can be expressed, as functions of the apex value $B_V$ and the full aperture stop value $A_{VO}$, by the following equation, derived by substitution from equation (4):

$$i_P' = K_4 B = K_3 2^{P_V} \qquad (14).$$

The base-emitter voltage $V_C$ of transistor 26 is expressed by equation (15) below. Further, this equation can be rearranged into equation (16) below by substituting therein equations (7) through (14).

$$V_C = V_A + V_B - V_D \qquad (15)$$

$$V_C = h\log \frac{K}{i_S} \cdot 2^{\{P_V + S_V - (A_V - A_{VO})\}} \qquad (16),$$

where $K = \dfrac{K_1^2 \cdot K_3}{K_2^2}$, and $V_1 = V_2$.

From equation (5), $T_V = P_V' + S_V - (A_V - A_{VO})$. Therefore, equation (16) can be rewritten as follows:

$$V_C = h\log \frac{K}{i_S} \cdot 2^{T_V} \qquad (17)$$

If it is assumed that the base-emitter voltage of transistor 22 is $V_E$, the voltage $V_M$ across the ammeter 28 can be expressed as follows:

$$V_M = (V_A + V_B - V_D) - V_E = V_C - V_E \qquad (18).$$

Substituting equation (17) into equation (18), $$V_M = T_V \cdot h\log 2 + h\log \frac{K}{i_S} - V_E \qquad (20)$$

If the value of $V_E$ is suitably selected with respect to the value of $h$, then the starting point for the pointer of ammeter 28 can be set at a desired value. For instance, if the value of $V_E$ is selected so that $h = V_E$ and $V_M = 0$ when $T_V = 0$, then this will be the starting point.

The circuit operation will now be described for an exposure time control mode in a stopped-down light metering condition. Equation (12) above for the value of $R_1$ remains the same, but the base-emitter voltage $V_B'$ of transistor 17, due to the photo-diode current $i_p$, is expressed as follows:

$$V_B' = h\log \left(\frac{i_P}{i_S}\right) \qquad (21).$$

In this mode the armature 32c of the change-over switch 32 is in engagement with contact 32b. If the value of resistor 31 is represented by $R_2'$ and the voltage across it is $V_2'$, then the compression current $i_2'$ and the voltage $V_D'$ at point D can be expressed by:

$$i_2' = \frac{V_2}{R_2'} \qquad (22), \text{ and}$$

$$V_D = 2h\log \left(\frac{i_2'}{i_S}\right) \qquad (23).$$

The value of resistor 31 is expressed by equation (24) below, generally corresponding to equation (13), as:

$$R_2' = K_2 2^{-0.5N} \qquad (24),$$

where $N$ is an optional constant.

The photoelectric current $i_p$ of diode 16 can be expressed, as functions of $B_V$ and $A_V$, by the following equation, derived by substitution from equation (3):

$$i_p = K_5 B = K_3' 2^{P_V} \qquad (25).$$

The base-emitter voltage of transistor 26, similar to equation (15), can be expressed by:

$$V_C' = V_A + V_B' - V_D' \qquad (26).$$

The Equation (26) can be rearranged, by substituting equations (7), (8), (21), (22), (23), (24) and (25) thereinto as follows:

$$V'_C = h\log \frac{K'}{i_S} \cdot 2^{P_V} + S_V - N \qquad (27),$$

where $K' = \dfrac{K_1^2 \cdot K_3}{K_2^2}$, and $V_1 = V_2$.

Equation (27) can be rewritten with reference to equation (6), as follows:

$$V'_C = h\log \frac{K'}{i_S} \cdot 2^{T_V - N} \qquad (28).$$

The voltage $V_C'$ of transistor 26 and its collector current $i_C$ are expressed as:

$$V'_C = h\log \frac{i_C}{i_S} \qquad (29),$$

and $$i_C = K' \cdot 2^{T_V - N} \qquad (30).$$

When switch 24 is opened in synchronization with the release of the front shutter curtain, the voltage $V_X$ across capacitor 25 increases with time $(t)$ as follows:

$$V_X = i_C \cdot \frac{t}{C_C} \qquad (31),$$

where $C_C$ is the capacity of the capacitor 25.

If the voltage at the positive terminal of the comparator 37 is represented by $V_S$, then the time $(t_1)$ from the opening of switch 24 to the deenergization of the magnet 38, corresponding to the exposure time, can be expressed by equation (32) below, and equation (33) may be obtained by substituting equation (30) into equation (32).

$$t_1 = V_S \cdot \frac{C_C}{i_C} \tag{32}$$

$$t_1 = V_S \cdot \frac{C_C}{K'} \cdot 2^{N-T_V} \tag{33}$$

In order to satisfy the definition of an apex indication of 1 second with $T_V = 0$, $V_X C_C/K.2^N = 1$ second. Then, $$t_1 = 2^{-T_V} \text{(second)} \tag{34}$$

This clearly establishes that the exposure time can be automatically controlled by the circuit of FIG. 3.

While it has thus been proven that exposure time display for full aperture light metering and exposure time control for stopped-down light metering may be implemented with the circuit of FIG. 3 by the operation of the change-over switch 32, the exposure time display function for stopped-down light metering will also be described for a full understanding of the invention.

For exposure time display in stopped-down light metering, the photoelectric current $i_p''$ of diode 16 can be expressed by equation (35) below, with reference to equations (14) and (3), while the base-emitter voltage $V_B''$ of transistor 17 can be expressed by equation (36), as follows:

$$i_p'' = K_3 2^{P_V} \tag{35}$$

and $$V''_B = h\log\left(\frac{i''_p}{i_s}\right) \tag{36}$$

From equations (7), (8), (22), (23), (24), (35) and (36) $V_C''$, similarly to $V_C$ of equation (16), is given by:

$$V_C'' = h\log\frac{K}{i_s} \cdot 2^{P_V + S_V - N} \tag{37}$$

In order that the exposure time display in full aperture metering is coincident with the exposure time display in stopped-down metering, $V_C$ must be equal to $V_C''$ ($V_C = V_C''$). Therefore, from equations (16) and (37), $N = 0$. By substituting $N = 0$ into equation (24), $R_2' = K_2$. Thus, both exposure time displays can be made coincident with each other if the value of the fixed resistor 31 is selected to correspond to the full aperture stop value of the variable resistor 30.

The change-over of switch 32 from exposure time display in full aperture metering to exposure time control in stopped-down metering is automatically accomplished by the drive member of either the reflecting mirror 3 or the front shutter curtain 9.

Where exposure time display in stopped-down metering is required, if $R_2' = K_2$ then the armature 32c is transferred from contact 32a to contact 32b in correlation with the depression of the camera preview button.

Although an ammeter has been disclosed for exposure time display, an analog-to-digital converter and display may also be employed.

As is apparent from the above description, according to the present invention the operations of two devices, that is a highly accurate exposure time control device which employs the light reflected by the front shutter curtain or the film surface, and an exposure time display device, convenient for quick photography, which employs the reflected light which passes through a beam splitter incorporated in the reflecting mirror, are enabled in the same camera by the transfer of a simple change-over switch coordinated with the operation of the camera. In addition, when an exposure time display in stopped-down metering is required, the change-over is readily achieved by linking the transfer switch to the preview button.

What is claimed is:

1. In a TTL, single lens reflex, focal plane shutter camera wherein, with a reflex mirror raised, light passing through a stopped down lens diaphragm and reflected by a front shutter curtain or a film surface onto a light sensing element mounted within the camera produces an object brightness signal which is applied to a light meter circuit to control the exposure time, and wherein light passing through a beam splitting portion of the lowered reflex mirror and reflected onto the light sensing element produces an object brightness signal which is applied to the light meter circuit to display the exposure time with a fully open lens diaphragm, an improved exposure time display and control circuit, characterized by:

(a) an exposure time control circuit including a time integrating charging capacitor (25).

(b) first switch means (24) for enabling the charging of said capacitor, (c) circuit means (26, 29) for controlling the charging rate of said capacitor, (d) a variable resistor (30) for establishing a lens diaphragm stop value in an exposure time display mode, (e) a fixed resistor (31) for establishing a lens diaphragm stop value in an exposure time control mode, (f) second switch means (32) for connecting one of said resistors to an input of said charging control circuit and (g) means coordinated with the depression of the camera shutter release button for transferring said second switch means from said variable to said fixed resistor, and subsequently transferring said first switch means to enable the charging of said capacitor.

* * * * *